(12) United States Patent
Pingeot (10) Patent No.: US 10,425,542 B2
(45) Date of Patent: Sep. 24, 2019

(54) METHOD FOR PRODUCING AND CUSTOMIZING MASS MARKET ITEMS WITH A VIEW TO ACCESS TO CUSTOMIZED CONTENT

(71) Applicant: DIGITAL PACKAGING, Sèvres (FR)

(72) Inventor: Gilles Pingeot, Le Chesnay (FR)

(73) Assignee: DIGITAL PACKAGING, Sèvres (FR)

( * ) Notice: Subject to any disclaimer, the term of this patent is extended or adjusted under 35 U.S.C. 154(b) by 0 days.

(21) Appl. No.: 15/780,729

(22) PCT Filed: Dec. 5, 2016

(86) PCT No.: PCT/IB2016/057360
§ 371 (c)(1),
(2) Date: Jun. 1, 2018

(87) PCT Pub. No.: WO2017/093984
PCT Pub. Date: Jun. 8, 2017

(65) Prior Publication Data
US 2018/0367682 A1    Dec. 20, 2018

(30) Foreign Application Priority Data

Dec. 3, 2015 (FR) .................................. 15 61828
Dec. 22, 2015 (FR) .................................. 15 70100

(51) Int. Cl.
*H04N 1/00* (2006.01)
*H04N 1/32* (2006.01)
(Continued)

(52) U.S. Cl.
CPC ......... *H04N 1/00251* (2013.01); *G06F 16/58* (2019.01); *G06Q 30/0281* (2013.01);
(Continued)

(58) Field of Classification Search
CPC .......... H04N 1/00251; H04N 1/32144; H04N 1/32149; G06F 16/9554; G06F 16/94; G06F 16/58; G06F 3/1243; G06F 3/1242
See application file for complete search history.

(56) References Cited

U.S. PATENT DOCUMENTS 5,748,783 A * 5/1998 Rhoads ................ G06K 7/1417
382/232
5,768,426 A * 6/1998 Rhoads ................ G06Q 20/341
348/460

(Continued)

FOREIGN PATENT DOCUMENTS

FR    2768967 A1    4/1999
FR    2998881 A1    6/2014
(Continued)

OTHER PUBLICATIONS

No Author. "HP SmartStream Designer—Data Sheet." (Jul. 1, 2015) XP055304544. http://h20195.wwww2.hp.com/v2/GetPDF retrieved on Sep. 21, 2016. 2 pages.
(Continued)

*Primary Examiner* — Nicholas Pachol
(74) *Attorney, Agent, or Firm* — Leason Ellis LLP (57) ABSTRACT

The invention relates to a method for producing a plurality of items (A) customized with visually coherent features, which includes the following steps: generating a plurality of unique decorative images each encoding a plurality of unique codes (Cx), each unique code 5 (Cx) being reconstructible through analysis of an image output from a digital camera of a communicating device that has captured a unique image (ICx), and each unique code (Cx) representing a unique address accessible, via a network, from said communicating device, and printing the unique decorative images on a plurality of respective items 10 (A) or on a plurality of substrates (Sx) intended to be attached to said
(Continued)

plurality of individual or grouped items using a digital printing system. Items are thus mass-produced, making it possible for every item, without using an optical bar code or QR code, to access 15 content or a unique digital space, with customization possible.

18 Claims, 6 Drawing Sheets

(51) Int. Cl.
    *G06F 16/58*     (2019.01)
    *G06Q 30/02*     (2012.01)
    *G06Q 30/06*     (2012.01)

(52) U.S. Cl.
    CPC ..... *G06Q 30/0621* (2013.01); *G06Q 30/0623* (2013.01); *H04N 1/0019* (2013.01); *H04N 1/00267* (2013.01); *H04N 1/32149* (2013.01)

(56) References Cited

U.S. PATENT DOCUMENTS

| | | | | | |
|---|---|---|---|---|---|
| 5,832,119 | A | * | 11/1998 | Rhoads | G06K 7/1417 382/232 |
| 5,850,481 | A | * | 12/1998 | Rhoads | H04N 1/32251 382/232 |
| 5,862,260 | A | * | 1/1999 | Rhoads | G06F 21/10 382/232 |
| 6,408,331 | B1 | * | 6/2002 | Rhoads | G06K 7/1417 709/217 |
| 6,535,618 | B1 | * | 3/2003 | Rhoads | G06Q 20/341 382/100 |
| 6,879,701 | B1 | * | 4/2005 | Rhoads | G06K 7/14 382/100 |
| 9,922,226 | B1 | * | 3/2018 | Boyd | G06K 7/1456 |
| 2001/0005423 | A1 | * | 6/2001 | Rhoads | G06Q 20/1235 382/100 |
| 2001/0010730 | A1 | * | 8/2001 | Rhoads | G06F 21/445 382/100 |
| 2001/0016051 | A1 | * | 8/2001 | Rhoads | G06K 7/1417 382/100 |
| 2001/0019618 | A1 | * | 9/2001 | Rhoads | G06K 7/1417 382/100 |
| 2001/0055407 | A1 | * | 12/2001 | Rhoads | G06F 21/10 382/100 |
| 2002/0018572 | A1 | * | 2/2002 | Rhoads | G06F 12/1408 381/1 |
| 2002/0029253 | A1 | * | 3/2002 | Rhoads | G06F 21/36 709/217 |
| 2002/0078146 | A1 | * | 6/2002 | Rhoads | G06K 7/1417 709/203 |
| 2002/0114492 | A1 | * | 8/2002 | Rhoads | G06Q 20/341 382/100 |
| 2002/0164049 | A1 | * | 11/2002 | Rhoads | H04N 1/32149 382/100 |
| 2003/0002710 | A1 | * | 1/2003 | Rhoads | G06K 7/14 382/100 |
| 2003/0031341 | A1 | * | 2/2003 | Rhoads | G06K 7/14 382/100 |
| 2003/0086585 | A1 | * | 5/2003 | Rhoads | G06K 7/1417 382/100 |
| 2003/0185266 | A1 | * | 10/2003 | Henrichs | H01S 5/18358 372/96 |
| 2004/0057581 | A1 | * | 3/2004 | Rhoads | H04N 1/32144 380/59 |
| 2004/0156548 | A1 | * | 8/2004 | Kodama | G06T 1/0021 382/232 |
| 2005/0196013 | A1 | * | 9/2005 | Rhoads | G06K 7/1417 382/100 |
| 2006/0062386 | A1 | * | 3/2006 | Rhoads | G06Q 20/341 380/236 |
| 2006/0097062 | A1 | * | 5/2006 | Cheong | G06K 19/06037 235/494 |
| 2006/0098241 | A1 | * | 5/2006 | Cheong | G06K 7/14 358/463 |
| 2007/0274560 | A1 | * | 11/2007 | Rhoads | G06K 9/00442 382/100 |
| 2007/0286451 | A1 | * | 12/2007 | Rhoads | G06T 1/0064 382/100 |
| 2012/0181330 | A1 | * | 7/2012 | Kim | G06Q 30/02 235/375 |
| 2013/0026241 | A1 | * | 1/2013 | Sakahashi | G06K 19/06037 235/494 |
| 2013/0260727 | A1 | | 10/2013 | Knudson et al. | |
| 2014/0119647 | A1 | * | 5/2014 | Cheong | G06K 9/18 382/166 |
| 2015/0231896 | A1 | | 8/2015 | Hattrup et al. | |
| 2016/0337358 | A1 | * | 11/2016 | Tonnelier | G06F 16/9554 |
| 2018/0157946 | A1 | * | 6/2018 | Landry | G06K 19/06037 |
| 2018/0268150 | A1 | * | 9/2018 | Curry | G06F 21/10 |

FOREIGN PATENT DOCUMENTS

| | | |
|---|---|---|
| FR | 3015444 A1 | 6/2015 |
| FR | 3021794 A1 | 12/2015 |
| WO | 2015015134 A1 | 2/2015 |

OTHER PUBLICATIONS

No Author. "HP SmartStream Designer." (Mar. 1, 2013) XP055304551 http://www8.hp.com/us/en/hp-news/press-center.html retrieved on Sep. 21, 2016. 2 pages.

International Search Report and Written Opinion in corresponding International Patent Application No. PCT/IB2016/057360, dated Jan. 19, 2017. 10 pages.

International Preliminary Report on Patentability in corresponding International Patent Application No. PCT/IB2016/057360, dated Jun. 5, 2018. 9 pages.

No Author. "HP Mosaic for SmartStream Designer: Generating One-of-a-Kind Graphics for Variable Data Campaigns." Sep. 16, 2015 (Sep. 16, 2015), XP055571138, https://www.printingnews.com/software-workflow/prepress/article/12099294/hp-mosaic-for-smartstream-designer-generatingoneofakind-graphics-for-variable-data-campaigns. Retrieved Mar. 19, 2019. 3 pages.

No Author. "HP SmartStream Designer 19 for Adobe Illustrator CC 2015", Sep. 21, 2015 (Sep. 21, 2015), XP055571444, https://h71044.www?.hp.com/ga/2009/_files_/content/smartstreamdesigner/download_/ca494-18850_hp_sms_designer_19_for_adobe_illustratoruser_reference.pdf. Retrieved Mar. 19, 2019. 58 pages.

No Author. "HP SmartStream Designer HP Mosaic—Dynamic Personalization How-to Guide", Nov. 1, 2014 (Nov. 1, 2014), XP055572372, http://tinyurl.com/y4r243w9. Retrieved Mar. 21, 2019. 17 pages.

Filiba. "Print-Scan Resilient Watermarking in the Wavelet Domain." Jan. 1, 2012 (Jan. 1, 2012 ), XP055572949, http://tomerfiliba.com/static/academia/DWTWatermarking/image-project.pdf. Retrieved Mar. 22, 2019. 23 pages.

European Examination Report in corresponding European Patent Application No. EP 16810075.8 dated Mar. 28, 2019. 8 pages.

\* cited by examiner

METHOD FOR PRODUCING AND CUSTOMIZING MASS MARKET ITEMS WITH A VIEW TO ACCESS TO CUSTOMIZED CONTENT

CROSS-REFERENCE TO RELATED PATENT APPLICATIONS

This application is a U.S. National Stage Application under 35 U.S.C. § 371 of International Patent Application No. PCT/IB2016/057360, filed Dec. 5, 2016, which claims the benefit of priority under 35 U.S.C. Section 119(e) of French Patent Application numbers FR 15/61828 filed Dec. 3, 2015, and FR 15/70100 filed Dec. 22, 2015, all of which are incorporated by reference in their entireties. The International Application was published on Jun. 8, 2017, as International Publication No. WO 2017/093984 A1.

FIELD OF THE INVENTION

The present invention generally relates to the field of the customization of items, in particular everyday or mass distribution items, and their packaging.

BACKGROUND OF THE INVENTION

Systems are already known allowing a person to customize packaging, for example the packaging of a gift for a loved one.

Such customization can be done with text, images, etc., which are downloaded from a computer system of the user to a server, the server being associated with printer equipment in order to print the text or image on an element of the packaging (paper, cardboard, plastic sleeve, etc.).

To that end, the client (the person giving the gift) accesses a dedicated website and can interact with the latter to customize the packaging (for example by entering text or downloading a photo file to the server).

Technical constraints (file format, color charter or fonts, trademarks, etc.) may be imposed on the entire process.

This website cooperates with the program able to generate the file directly (for example, a PDF file) usable for direct printing using appropriate digital printing equipment.

The user can preview the PDF file before final validation. He can also receive the validated PDF file by email after having placed his order.

Methods are also known for diversifying packaging or appearances of a same commercial product manufactured on a large scale. Thus, today, beverage bottles are becoming widespread with first names on them, as well as many consumer goods with diversified visuals.

BRIEF DESCRIPTION OF THE INVENTION

The present invention aims to extend the possibilities for diversifying the visual appearance of consumer goods, advertising items, gifts, etc., while disrupting this visual appearance as little as possible for the consumer.

In particular, one aim of the invention is to associate a product subject to large-scale production with a single address of a space accessible by network from smart equipment, without using a specific visible code such as barcodes, QR codes or the like, which may be detrimental to the visual appearance of the product.

A secondary aim of the invention is to be able to account for image deformations occurring when shrinkable decorative sleeves are applied on curved or cylindrical products, which may lead to reading errors due to these deformations.

Thus, proposed according to a first aspect is a method for producing a plurality of customized consumer items, characterized in that it comprises the following steps:

generating a plurality of unique decorative images each respectively encoding a plurality of unique codes, each unique code being reconstructable through analysis of image output from a digital camera of a communicating device that has captured a unique image, and each unique code representing a unique address accessible, via a network, from said communicating device, and printing the unique decorative images on a plurality of respective items or on a plurality of substrates intended to be attached to said plurality of individual or grouped items using a digital printing system.

This method advantageously, but optionally comprises the following additional features, considered individually or in any technically compatible combinations:

the plurality of unique images are generated by fragmenting a source decorative image to be visually coherent with one another.

the source decorative image is a vectorial image.

the image analysis is done without being color-sensitive.

the plurality of unique images are further generated by superposition on the decorative images derived from a fragmentation of the source decorative image from pattern images derived from a fragmentation of at least one source pattern image.

the or each source pattern image comprises simple geometric elements respectively contained in the various zones of a grid used for the fragmentation.

the unique images are also generated from a mirror image of the or each source image.

the unique addresses comprise unique addresses for personal areas.

the unique codes are associated uniquely with geometric and/or colorimetric characteristics of the unique images.

the method further comprises a step for storing all of the addresses associated with the plurality of items for differentiated processing.

the method being applied to unique images printed on media intended to be applied on items such that the unique images are subject to deformation during this application, it comprises a prior step for developing a shared anamorphosis law between the printed unique images and the images as they appear, captured by a camera, on the items.

the step for developing an anamorphosis law comprises the sub-steps for printing a template comprising remarkable elements on a template holder, applying the template holder on the item or group of items, taking a shot of the template after application, and determining movement data of the remarkable elements from the acquired image.

the step for developing an anamorphosis law comprises the sub-steps consisting of providing data for a virtual template including remarkable points, providing surface data of a three-dimensional volume of the item, developing data of three-dimensional coordinates of the remarkable points after digital processing for application of the virtual template on the surface of the three-dimensional volume of the item, providing data for at least one virtual sighting axis, and determining, from said data of three-dimensional coordinates and sighting axis data, by projection in a virtual image plane, displacement data of the remarkable points between the virtual template and the result of the projection.

Proposed according to a second aspect is a method for managing a personal area accessible by network from communicating equipment using a unique address, characterized in that it comprises the following steps:

capturing a unique image on an item obtained using the method according to the first aspect of the invention using a camera of the communicating equipment, decoding the unique address encoded in the image from the capture, in response to this decoding, accessing the personal area, in the personal area, performing at least one action from among reading data and writing data.

This method advantageously, but optionally comprises the following additional features, considered individually or in any technically compatible combinations:

the step for accessing the personal area is made subject to the implementation of another capture of an identical or different coding image using the same communicating equipment.

the method comprises a step for accessing the personal area in write mode in response to a capture of a unique coding image using a first piece of communicating equipment, and a step for accessing the personal space at least one reading in response to a capture of the same unique coding image using a second piece of communicating equipment.

the method comprises steps for accessing a shared personal area in response to captures of the same unique coding image by different pieces of communicating equipment.

when an anamorphosis law is involved, the method further comprises a step for applying, in the communicating equipment, an inverse law of the shared anamorphosis law to the unique image captured by the camera, before the decoding step carried out by the communicating equipment.

when an anamorphosis law is involved, the method further comprises, at a server, a step for applying the anamorphosis law to a set of unique images to be applied on items and storing the resulting anamorphosis images, the decoding step being carried out at least partially at the server in the context of a decoding transaction between the communicating equipment having captured an image on an item or medium and said server.

BRIEF DESCRIPTION OF THE DRAWINGS

Other aspects, aims and advantages of the present invention will better appear upon reading the following detailed description of one preferred embodiment thereof, provided as a non-limiting example and done in reference to the appended drawing, in which.

DETAILED DESCRIPTION OF ONE PREFERRED EMBODIMENT

Figure 1:
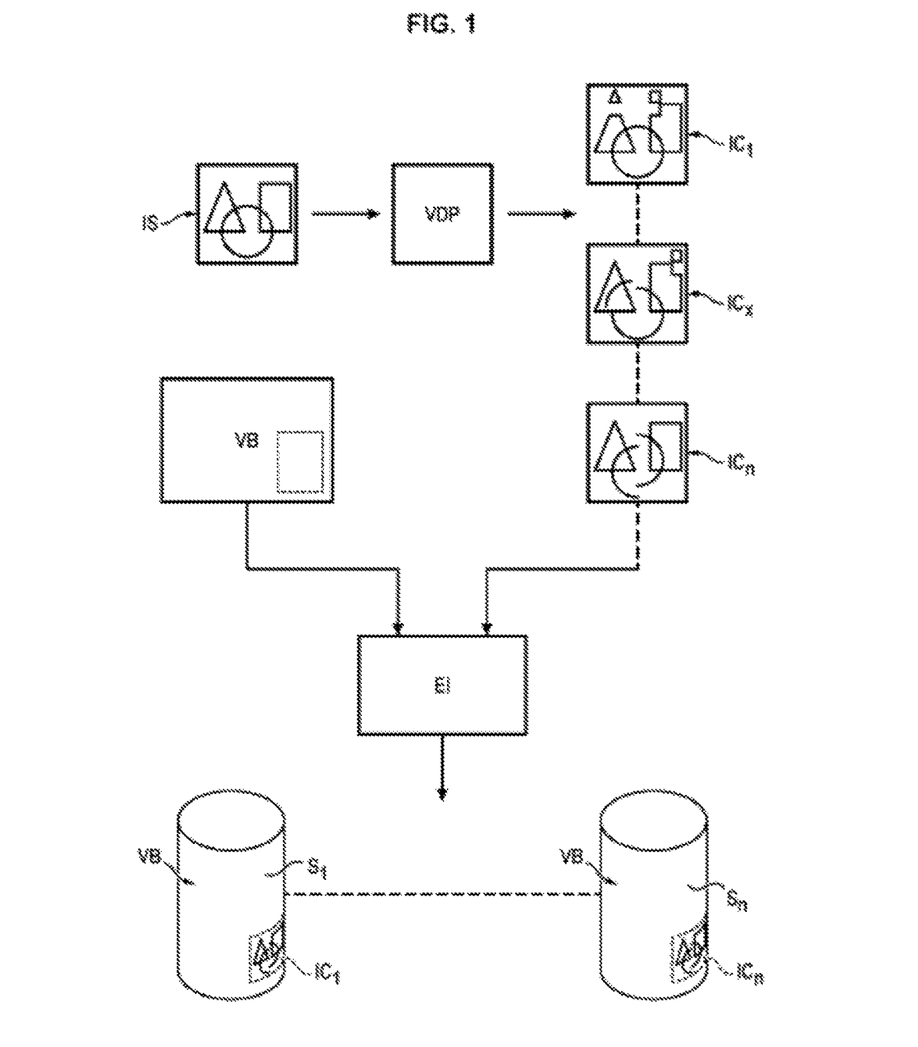
FIG. 1 schematically shows a method for associating unique addresses usable by communicating equipment with sets of consumer items.

In reference first to FIG. 1, a system is shown for generating packaging, decorative sleeves, etc. for products each incorporating a variable decorative image ICx encoding an address (typically a URL address) for a storage area intended to become a personal area, to be shared if applicable, associated uniquely with the product.

In a first embodiment, the generation of the variable decorative images ICx is done using a variable data printing (VDP) tool, for example based on the Mosaic® of the SmartStream Designer® solution marketed by the company Hewlett-Packard, United States of America. Such technology is capable of generating thousands of different images from a source image file, by fragmentation of the source image combined with digital processing operations (translations, rotations, or more complex conversions) of these fragments, while preserving a very homogeneous visual impression of the set of images if the source image itself is homogeneous.

In one embodiment, this source image file IS contains a visual (shapes, colors, etc.) for example chosen based on a basic visual VB of the package, for example a visual coherent with the appearance of a trademark associated with the gift that will be contained in the package, such that each unique image obtained with the VDP tool in turn has a visual that remains coherent with the appearance of the trademark. This property is, however, completely optional.

Typically, the source image IS can be any combination of shapes and colors (logo of the trademark, image of the product contained in the package, decoration, etc.).

Furthermore, each unique image ICx generated by the VDP tool is processed so as to encode a single address Cx (URL or the like) in order to allow a user, for example using his smartphone, to interact with the server in order to customize content associated with this unique address, as will be seen later.

In a first embodiment, this encoding is done by a combination of the aforementioned "Mosaic" technology and a commercially available image recognition technology, capable of associating a given unique image with a unique numerical code. This technology may for example be one of the following:

LTU Cloud, provided by the company Jastec France, Paris, France (see http://www.ltutech.com/fr/);
LogoGrab (see https://www.logograb.com/);
Camfind (see http://camfindapp.com/);
Recognize API|Mashape (see https://www.recognize.im/);
Kooaba by the company Qualcomm (see https://www.qualcomm.fr/);
Moodstocks, held by Google;
Catchoom (see http://catchoom.com/);
Imagga API (see https://imagga.com/)
TinEye (see https://services.tineye.com/TinEyeAPI)
Pictorria—is a platform for sharing image recognition algorithms
Picitup API—http://www2.picitup.com/picliq
Deepvu vufind—http://www.vufind.com/photo-analytics.html Talk Walker (see http://go.talkwalker.com/IQ-Apps-Landing-Pages_Image-Recognition.html).

Most of these solutions propose application programming interfaces (API) making it possible to design apps, in particular for terminals such as smartphones, integrating them.

From these solutions, each image can be discriminated relative to the others by image analysis and can be associated with a unique identifier, which in turn, as will be seen hereinafter, will make it possible to steer the application toward a digital area (for example accessible via a URL) bijectively associated with the considered image.

In a more specific example embodiment, the Mosaic® technology is used to generate, from a vectorial source image file IS, in particular by division into slabs, rotations, zooms, a relatively large number of unique individual images that image recognition software like that based on the LTU technology is capable of discriminating.

Figure 2:
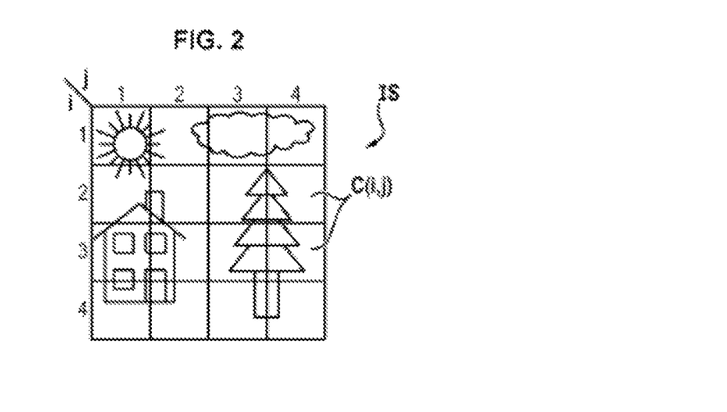
FIGS. 2 to 6 show simplified illustrations of methods for generating unique images intended to be implemented in the method of FIG. 1, FIG. 7 schematically illustrates a method for accessing a unique area associated with a given item obtained using the method of FIG. 1.
Figure 3:
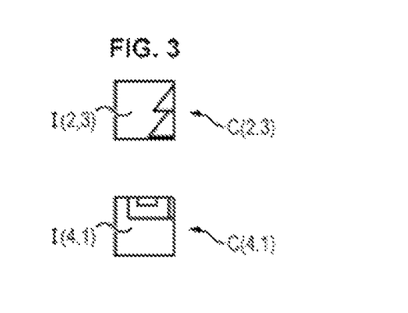

Thus, in reference to FIGS. 2 and 3, a source vectorial decorative image file IS, in the present example, is broken down, using N×N slabs or panes C(I,j) (here only 4×4 panes to illustrate the invention in a simplified manner), into N×N sub-images I(i,j) of the initial image, corresponding to the respective panes. Each sub-image I(i,j) is used as unique image ICx to generate diversity in the visuals to be printed for as many items. To that end, the system generates, from each pane, made up of a sub-image of the vectorial image, a bitmap image intended to be inserted in the appropriate location of an overall image intended to be printed on the item (or on a sleeve, or on a package, etc., of the item).

FIG. 3 thus illustrates two sub-images I(2,3) and I(4,1) corresponding to the panes C(2,3) and C(4,1) of the initial image IS.

The Mosaic® commercial solution marketed by Hewlett-Packard is capable of performing this initial processing.

To double the number of possible sub-images, the system can create, for each sub-image I(i,j), a second sub-image I'(i,j) that is the mirror image of the initial sub-image I'(i,j). This processing is done simply by inverting coordinates along the one of the two axes, either at each sub-image, or at the source vectorial image IS whose system first forms a global vectorial mirror image IS', then forms sub-images along the same grid as for the image IS, from this overall mirror image IS'.

Furthermore, if the "mirror" digital processing is done directly at the sub-images, it can be done either at the vectorial sub-images, or after bitmap conversion of the latter.

Figure 4:
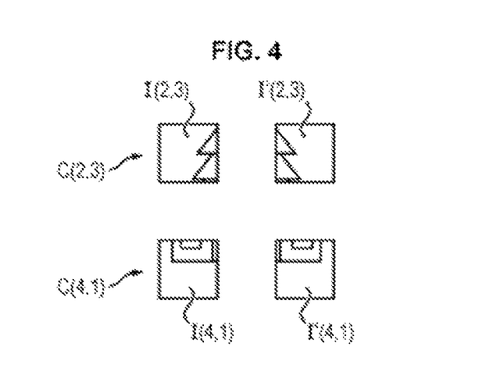

Thus, FIG. 4 illustrates two sub-images of the initial image IS, namely I(2,3), I(4,1) here again corresponding to panes C(2,3) and C(4,1), as well as two sub-images I'(2,3), I'(4,1), which are derived from the images I(2,3), I(4,1) by applying the mirror function (here a horizontal reversal).

However, in practice, the diversification technologies from a source vectorial image make it possible to obtain a relatively limited number of diverse sub-images capable of being identified by image analysis without generating duplicates (typically several thousand). This may prove suitable for diversifying items manufactured in moderate quantities, but is not appropriate when it involves diversifying millions of items. Thus, in the preceding example, a subdivision of a source image into 100×100 panes makes it possible to produce 10,000 sub-images, and this number can be doubled with the use of mirror sub-images.

If the subdivision of the initial image is finer, the discrimination capacity between sub-images decreases quickly, and one reaches the limitations of the approach.

We will now describe an improvement making it possible to achieve the aim of a very large multiplication of the diversified sub-images, without significantly complexifying the process.

According to this improvement, initially, not only is a source image IS prepared like before (hereinafter referred to as "decorative image"), but also a source pattern image MS (hereinafter referred to as "pattern image").

Unlike the source decorative image IS, the constraints of which are on the one hand that it has a rich content, harmonizing with the packaging of the products (if this criterion is desired), and on the other hand that no two panes exist with identical sub-images, or in any case that are not discernible from one another through the image analysis solution, the source pattern image MS can be made much less restrictively: it does not need to satisfy esthetic criteria, and it can include simple patterns, while thus being extremely easy to generate (its generation even being able to be automated without difficulty).

Figure 5:
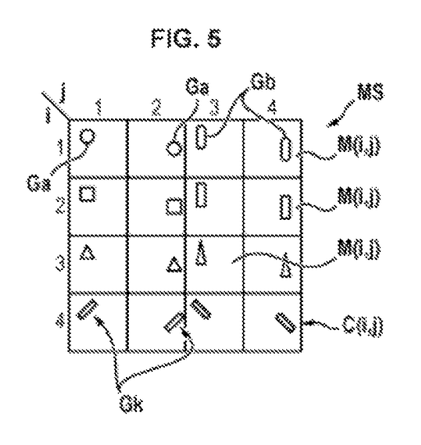

A simplified example of the source pattern image MS is shown in FIG. 5. This image is such that when it is subdivided according to a grid C(i,j) identical to that used for the source decorative image IS, at each pane C(i,j), a sub-image (M(i,j) is found of the source pattern image MS, containing a simple graphic element such as Ga, Gb, Gc, etc.

Each pattern Gk is for example a basic geometric shape (dash, closed or open shape, simple combinations of dashes and/or shapes) preferably arranged non-symmetrically in the respective pane.

Furthermore, as illustrated, it is possible to provide, in a certain pane, a certain pattern, and in one or several other panes, an identical pattern, positioned differently.

The fragments of the source pattern image MS are used as copies of the fragments of the source decorative image IS, to generate unique images that are combinations of each sub-image of the decorative image with each sub-image of the pattern image, the diversity provided at the two types of sub-images making it possible to guarantee the diversity of the combined sub-images.

Figure 6:
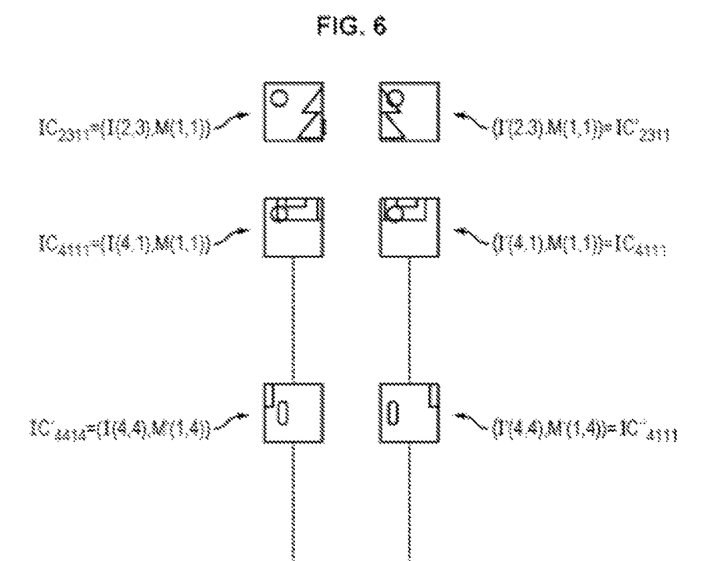

FIG. 6 illustrates different examples of combinations of sub-images I(i,j) of the decorative image and sub-images M(i',j') of the pattern image, these combinations being denoted (I(i,j), M(i',j')) or ICiji'j' optionally completed by "apostrophe" when mirror images are involved.

It is understood that for 100 sub-images of the decorative image (10×10 grid) and 100 sub-images of the pattern image (same grid), it is possible to obtain 10,000 different sub-images.

If one also uses a mirror image of the decorative image and a mirror image of the pattern image (by then arranging the graphic elements necessarily non-symmetrically in the respective pane), this number can be quadrupled.

Additionally, by using a second source pattern image MS2 with the same configuration as the pattern image MS but with graphic elements that are intrinsically different and/or arranged differently in the respective panes, one goes from 10,000 to 1,000,000 unique sub-images. By using the mirror images for the image I and the images MS and MS2, this number is brought to 8,000,000 unique sub-images.

In practice, the following steps are carried out:

a) using vectorial design software, the source decorative image IS is produced, with an appropriate complexity for its subdivision into N×N panes (or N×P panes for example for a decorative image that is not square), to make it possible to generate unique sub-images;

b) using vectorial design software, one or several source pattern images MS, MS2, etc. are produced containing simple graphic elements, preferably one element per pane when the same division is done as that of the decorative image;

c) digital processing next generates vectorial files of the different sub-images of the source decorative image IS and of the source pattern image(s) MS;

d) digital processing for superposition of copies next generates the different combined sub-images.

In the case where the system also uses the mirror images, steps are added for generating the mirror decorative image and the mirror pattern image(s) upstream from the subdivision, or steps for generating mirror decorative sub-images and mirror pattern sub-images downstream from the subdivision (or any combination of these two approaches).

Advantageously, once the files for all of the sub-images to be printed on items have been generated, digital processing is done for detecting duplicates, preferably based on the same image analysis processing as that which will be done in the application hosted on the user terminals.

The detected duplicates are eliminated.

The files for the remaining sub-images are next, if applicable, combined with the main file for printing on items, so as to obtain a diversification of the printing and to have each item be able to correspond to a unique code, as will be developed hereinafter.

Different approaches are possible to assign a unique code to a unique sub-image. Preferably, a unique code is formed from an analysis of the geometric and colorimetric characteristics intrinsic to each printed sub-image; the solution commercially available under the name "LTU mobile" and offered by the company Jastec France is capable of performing this function.

Preferably, this analysis is done in a manner not sensitive to colors (in particular by focusing on the outlines of the vectorial elements of the image), so as to prevent two communicating terminals whose cameras have different colorimetric responses from being able to generate different codes for a same unique image.

The method implements printing equipment EI able to print multiple packages or decorative media Sx for items, each package integrating a unique coding image ICx as described above.

This may involve any type of printing technology, but the equipment is preferably digital laser printing or latest-generation inkjet printing equipment.

The printing equipment EI is controlled so as to print the packaging or media Sx, the visuals of this packaging being generated for example by integrating the variety of aforementioned unique coding images IC into a base image file, shared for all of the packaging. A connection between each package and a unique address is thus created.

It will be noted here that packaging refers to any printable support able to be integrated, in the manufacturing chain stage or downstream, into a unit for large-scale item production.

This may for example involve heat shrinkable sleeves, adhesive labels, boxes, tubes, etc., able to be placed on packages such as bottles, jars, vials or other containers, this list not being exhaustive.

Alternatively and for certain types of items, it is possible to print directly on the items.

According to other alternatives, the variable images can be generated without using a shared source image. Furthermore, the base image shared by all of the items may be nonexistent.

Subsequently, and now in reference to FIG. 7, when a person takes possession of one of the items (purchased item, item given as a gift, etc.), he may, using a smartphone, tablet or other communicating equipment EC provided with a digital camera C and a software application dedicated to extracting codes contained in the coding images, capture the coding image ICx printed on the packaging Sc of the item A using said camera and extract the code contained in the coding image ICx, and the equipment then automatically accesses, via a communication network such as the Internet, a unique page EPx accessible on a server, embodying a personal area accessible online and designated by the address formed by the extracted code Cx or derived from this code. Depending on the type of encoding, this code extraction can be done either simply by processing applied to the captured image, or by preprocessing applied to the captured image and comparison of characteristic points with a table of characteristic points, and using a code stored in the row of the table for which a correspondence exists between the characteristic points.

This server page EPx proposes a certain number of functionalities making it possible to customize its content, either for the use of the person possessing the item, or for the use of a person who intends to give or sell the item. This customization may in particular comprise:

downloading to the server, to be accessible at the same address, pre-existing multimedia content or content created for the occasion (video sequences, images, music, voice messages), entering messages intended to be displayed at this address, adding links making it possible to benefit from promotions, advantages, privileges, etc.

Subsequently, the person who has this item (either its original holder, or a person to whom this item has been given, for example) can access this unique area and find this content, messages, links, etc.

According to one alternative, it is also possible to customize the areas individually associated with the products either before the products are distributed or afterwards. Indeed, by storing all of the unique addresses designated by an equal number of coding images on the products, it is possible for a lottery, drawing, etc. organizer to award particular rights to some of these addresses, chosen randomly or from a sequenced list. For example, it may be provided that out of a series of 10,000 marketed products, 100 lead to particular winnings or advantages.

These winnings or advantages may be embodied by special information such as links to sites offering gifts, displaying promotional codes with certain merchants, etc.

These functionalities may further be implemented dynamically and automatically, an advantage being able to be offered for a predetermined length of time. This may lead the holders of products to capture images borne by the items several times, for example to verify whether they have won a prize.

Another application of the invention may consist of matching two codes contained in the coding images of two items (or more), for example chosen randomly. One thus creates pairs of codes making it possible to benefit from privileges, prizes, etc.

Subsequently, for example in the case where two people holding a same item meet, capturing a coding image borne by one of the items, then the coding image borne by the other item, by the same communicating equipment, followed by querying by this communicating equipment of a server where the pairings are stored, makes it possible, in the event such a pairing of the two codes is recognized, to collect, at the equipment, information indicating that a privilege is granted, a prize has been won, etc.

It is also possible to vary the pairings dynamically to allow people to meet to try their luck several times.

Furthermore, it will be noted that the data written by the holders of items in the personal areas designated by the codes borne by these items may be subject to structuring, for example in a sales database.

Furthermore, to prevent, when the items are displayed for sale (for example in a supermarket), the coding images from being read before the products are purchased in order to access the personal areas and for example to load the content malevolently or parasitically, several solutions can be considered:

- it is possible to provide that the code derived from a coding image is only usable once the images have been captured twice by the same communicating equipment, with a certain length of time between the two captures (interval may vary depending on the context),
- it is possible to provide that the code derived from a coding image is only usable after another coding image, for example displayed upon leaving the point-of-sale or on a consumption site, has been captured and decoded by the same communicating equipment,
- it is possible to provide an interaction between the access system in a personal area using a code contained in a coding image and the payment system of the store, etc.

Figure 8:
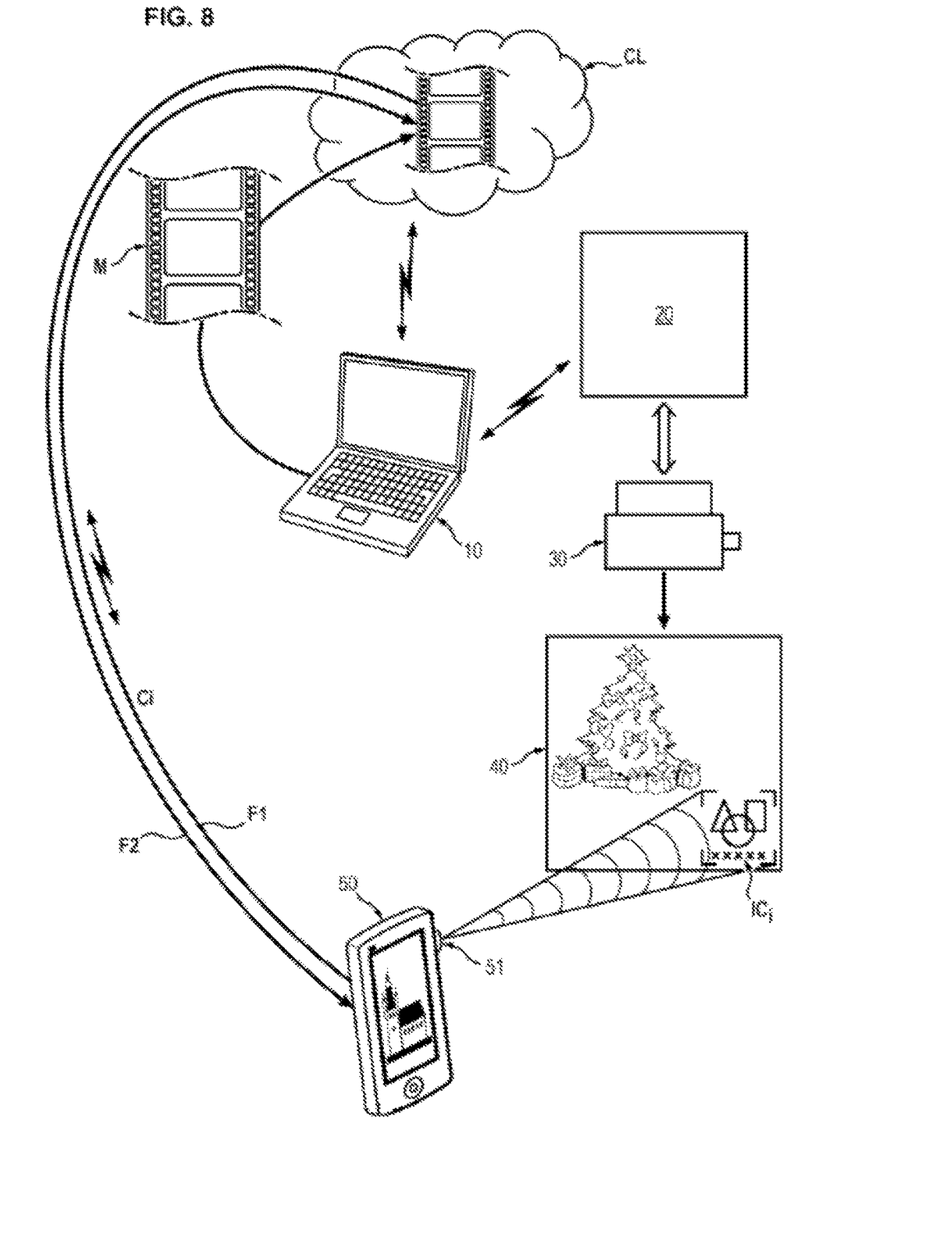
FIG. 8 illustrates a particular application of the invention for customizing a gift wrapping, and FIG. 9 schematically illustrates the use of a heat shrinkable sleeve provided with a template for carrying out an anamorphic conversion in one improvement of the present invention.

In reference to FIG. 8, we will now describe a particular use of the generation of unique coding images of the present invention, dedicated to gifts with customized message(s) from the person giving the gift.

A user computer system 10 such as a personal computer, tablet, smartphone, etc., contains means for interacting with a remote server 20, such as a web browser associated with network communication equipment, in a manner known in itself.

This interaction, aside from any steps for selecting a gift, payment, etc., comprises the steps consisting of making multimedia content M, such as a video sequence, a sequence of slides, for example containing a personal message for the person who is receiving the gift accessible via a network such as the Internet.

This multimedia content can easily be obtained with a device equipped with a camera, such as a smartphone or a tablet, or with a camera of the user system 10 itself.

In one basic embodiment, this step comprises downloading multimedia content to the server 20 or to another server with which the server 20 is associated, to allow a person receiving the gift to access this content later, as will be explained later.

Figure 7:
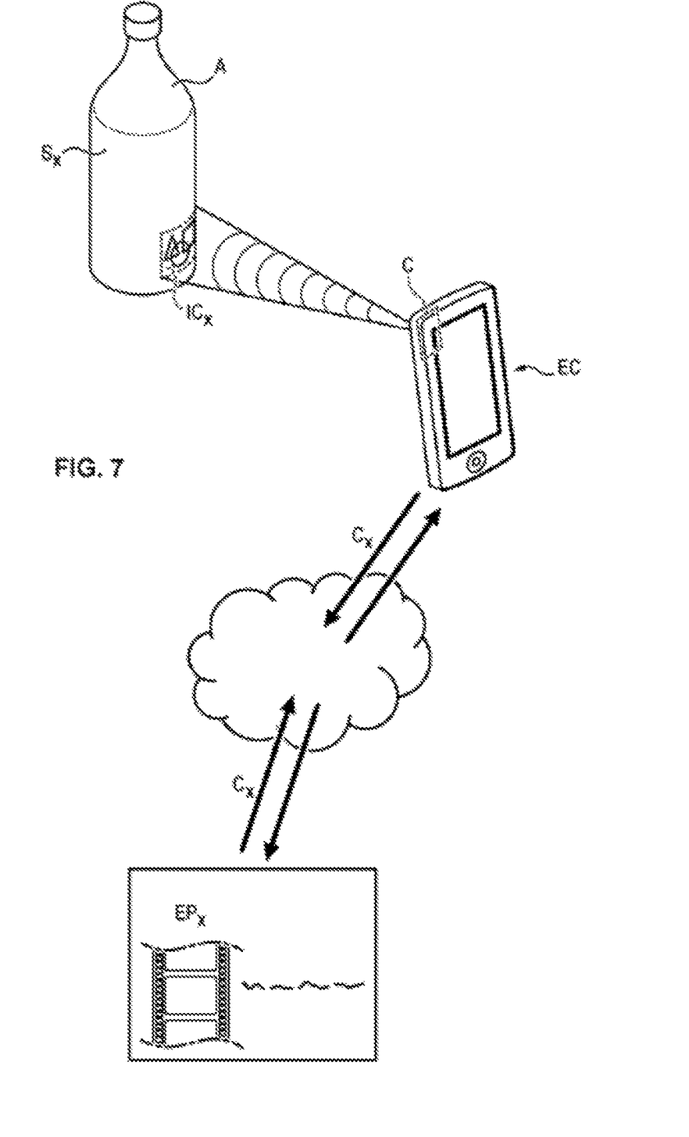

In another embodiment, and as also illustrated in FIG. 7, this step may comprise storage in the cloud CL of the multimedia content, an address such as a URL (Uniform Resource Locator) being associated with this content for later access to the content and to read it.

In still another embodiment, it is possible to provide the use of the user system 10 as server making it possible to store and access the multimedia content.

When the server 20 receives a request from the user system 10 from the person giving the gift, it generates a package integrating a unique variable image ICx encoding the address Cx (typically the URL) of the multimedia content, said address, depending on the type of storage of the multimedia content, being either determined at the system 10 and sent to the server 20, or determined at the server.

The generation of the coding variable image is preferably done as previously described, here on a case-by-case basis instead of the large series generation as previously described.

The server 20 is associated with printing equipment 30 able to print packages for items.

The printing equipment is controlled by the server 20 or by another computer system connected to the server 20, so as to print the package 40 of the ordered gift, the visual of this packaging being generated by integrating the aforementioned unique coding image ICx into a base image file, shared for all of the packages. A link between the package and the multimedia sequence is thus created.

Later, when the recipient of the gift receives the latter, he may, using a smartphone, tablet or other communicating equipment 50 provided with a digital camera 51 and software dedicated to extracting codes contained in coding, capture the coding image printed on the package using said camera and extract the code contained in the coding image ICx, and the equipment then automatically accesses (arrow F1) the multimedia content stored at an address formed by the extracted code or contained therein, and reads the content, for example in streaming mode, downloading of the content before reading nevertheless being possible, as illustrated by arrow F2.

Thus, in addition to other possible customizations of the packaging 40 (text messages, photographs, etc.), the packaging produced according to the invention has another type of customization, with a link to a video or another multimedia message prepared in advance by the person giving the gift, and without having to integrate an optical pattern (barcode, QR code, etc.) into the packaging that could be detrimental to the overall appearance of the packaging, and while making sure that all of the variable images are coherent with one another and fit with the basic visuals of the packaging in the desired manner.

In one embodiment, the multimedia content, such as a video message, can be concatenated with a company video or an advertising video when it is read by its recipient.

Optionally, the packaging done by digital printing can optionally include a second image, preferably of the same type as the coding VDP image as previously described, in which an address is encoded (for example an email address of the person giving the gift, associated with a "mailto" function), which the person having received the gift can take a picture of with the camera 51 of his equipment 50 so as to send a thank you message to the person having given the gift. The code integrated into the second image VDP can alternatively contain a URL address of a dedicated response server, on which the person having received the gift must first enter his personal information (name, address, email address, etc.), then enter a response (or download a picture or video, according to the same principles as those described above). This makes it possible, for sales purposes, also to collect information on the person receiving the gift. In this case as well, the video message can be concatenated with a company video or an advertising video when it is read by its recipient.

Another possibility consists of having the message of the multimedia content M preceded by a promotional message of the brand of the gift. To that end, the server can include means for adding such a promotional message to the content M.

The customization described above can be done when the gift is purchased (for example by online purchase) or later, after buying the gift. In latter case, the process is for example as follows:

a) a person buys an item (the gift) in a store. On the packaging (standard) of the item, an image VDP is printed encoding a URL address making up the address of a customization server (a website).

b) with his user system 10, the person connects to this website. Advantageously, in order to prevent ill-intentioned people from abusing the system, the server asks the person to enter personal information (name, address, email address, etc.) and a specific text code (for example a one-time password or OTP), as also printed on the packaging; this can be done on the buyer's computer system after he has returned home from making his purchase, or in any other location with a portable system such as a smartphone, or even in the store where he has made his purchase, using a dedicated customization machine provided in the store for customers.

c) the server compares the received code with a previously stored code so as to allow the user to perform the customization. If the same code has previously been used by the same user, access to the customization is refused.

d) using a dedicated interface, the user can download a text message, one or several photograph files and a video or link to a video to the server; the video can be downloaded as pre-existing file, or streamed to the server while it is recorded using a webcam or other camera of the system 10; alternatively, the user can download a link (URL) to a pre-existing public or private video, for example a video accessible by the YouTube® server. Similarly, one or several still images can be downloaded to the server; before validation, it is possible to propose to the user to print, on his personal printer, an image of the packaging as it will appear, for example in the form of a PDF file generated at the server and sent by the latter, and/or to view a three-dimensional rendering of the packaging, either on a webpage generated dynamically by the server, or also contained in a PDF file.

e) from there, a customized printing service connected to the server prints a customized packaging including the text message, the photograph(s) and a link encoded in a unique coding image IC taken from a stock of unique coding images stored or generated on the fly (code in the form of a public or private URL) and pointing to the video; a type (format, papers or packaging film type, model, etc.) of the customized packaging can be determined either from the URL used to access the customization server, or from a unique password entered to authorize the customization.

f) this customized packaging is then sent by mail or by messenger to the user, who can then package the item with this packaging, either as second packaging layer, or after having removed the original standard packaging; the customized packaging is advantageously in the form of a sleeve that can be slid around the item and fastened with adhesive elements provided on the sleeve.

f') in one alternative embodiment, the customized packaging can be made "at home", and for example a PDF file containing the customized packaging with the text, photos and an image zone IC in which the address of the video message is encoded (i.e., the aforementioned validation PDF file) is sent to the user for printing on his own printer, then fastening on the gift or on its standard packaging.

g) the user then sends the item to its recipient by mail, special carrier, etc.

According to this process, writing is done in the personal area in response to a capture of a unique coding image using a first piece of communicating equipment (that of the person giving the gift), and a step for accessing the personal area at least in read mode in response to a capture of the same unique coding image using a second piece of communicating equipment (that of the person receiving the gift).

According to another application, it is possible to provide that several people, for example during a festive event, use their respective communicating equipment to read a same coding image (for example printed on a food container to be shared such as a bottle, a pastry package, etc.) to be able to write in this shared area, and for example to download photos there.

In this case, the method comprises steps for accessing, in the write mode, a shared personal space in response to captures of the same unique coding image by different pieces of communicating equipment.

Of course, if the item is purchased online, the steps for purchasing the item and customizing its packaging can be done in a single process or in two processes linked to one another, for example with redirection to a customization website during the purchase transaction or after the latter is complete. The operation for packaging the item with the customized packaging is then done directly at the source and not by the user.

The techniques described above work well in the case where printed images are affixed on flat surfaces or surfaces with a small degree of curvature.

We will now describe the improvement of the invention seeking to allow the recognition of coding images when they are deformed during the implementation of their support on the manufacturing chain, and in particular when they are affixed on cylindrical surfaces, curved surfaces, surfaces of revolution such as bottles having worked silhouettes, the aim being to avoid decoding errors due to the deformation of the images inherent to such a situation.

In this respect, one of the most widespread conventional techniques to apply a decoration on a container such as a bottle or vial consists of printing a heat shrinkable sheet, closing the sheet and gluing it to itself to form a sleeve, bringing the tube around the container and applying heat (typically a hot air flow) to cause the withdrawal of the material and to cause it to be in close contact with the outer surface of the item.

It will be understood that this involves a transformation of the geometry of the visuals printed flat, or anamorphosis, the latter being found on a curved surface.

This may also occur with cardboard cartridges deformed when deployed, labels glued on cylindrical surfaces, etc.

This only happens if precautions are not taken, the capture of a coding image from a camera if the coding image thus undergoes anamorphosis. For example, a coding image affixed on a cylindrical container with a small diameter will have fuzzy edges, with a distortion in the captured image that may prevent decoding the image and deducing the address therefrom of content that it designates.

We will now describe three alternatives of the method for affixing coding images on everyday consumer products that make it possible to bypass this difficulty.

Figure 9:
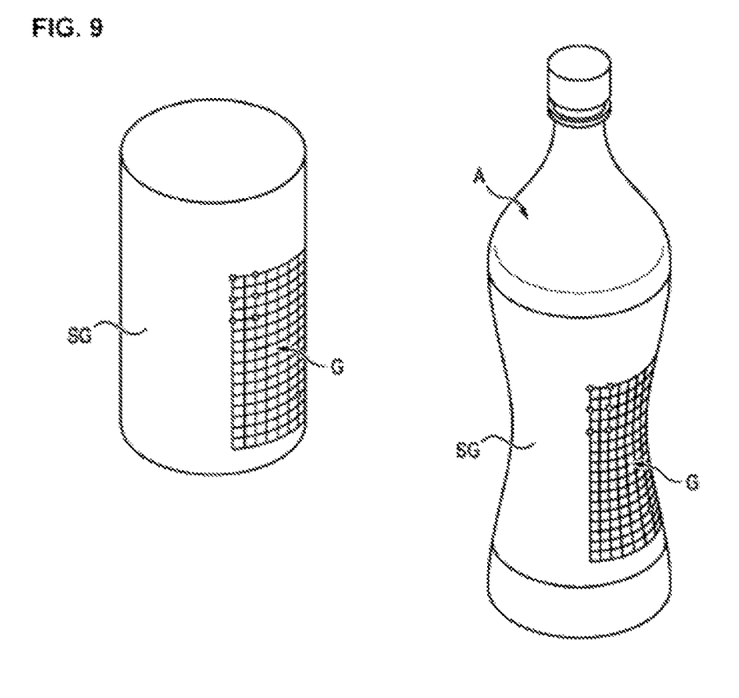

Alternative 1 a) a template holder SG intended to provide a sleeve is printed with a template G and placed on an item A of the type to be processed according to the invention; as illustrated in FIG. 9, this sleeve preferably has, for printing, a template G formed by a regular grid of lines orthogonal with respect to one another and with constant spacing, with lines with different thicknesses and/or remarkable points (in terms of size and/or shape) at intersections between lines and/or within boxes of the grid; after removing the template sleeve on the item A (here a curved bottle), it is understood that the grid has undergone anamorphosis due to the shape of the item, as will the coding images during the affixing of the individualized sleeves on the production chain;

b) one or several images of the item equipped with the template sleeve after removal are taken using a camera, preferably with different viewing angles, focusing on the zone in which the coding image must be located on the final items;

c) from images taken and a reference image representing the template, as used for printing of the sleeve, an anamorphosis law is established by image analysis, by comparing the original template image, regular, and the captured image (s), after coordinate system recalibration in a manner known in itself; the parameters of this law are essentially made up of movement vectors determined from the movement of remarkable points and/or expansion/contraction coefficients zone by zone, determined by the variations of the spacing between the lines of the template;

d) an inverse anamorphosis law is established from the anamorphosis law;

e) each diversified coding image to be printed on a final item is processed while being subject to the inverse anamorphosis law before printing on its respective sleeve, to be deformed according to this inverse anamorphosis law;

f) each sleeve is printed with a respective deformed coding image, then affixed on the item and retracted by adding heat; it is understood that at the end of this operation, it is an image identical to the original coding image upstream from step e) that will be visually apparent on each item (with the exception of any errors).

Thus, during the later capture of the image by the camera of a user terminal on a given item, the on-board analysis and decoding software is capable of reconstituting the code integrated into the image and the address accessible by network uniquely associated with this item.

Alternative 2 a) to d): steps identical to steps a) to d) of alternative 1;

e) the coding images are printed as is on the heat shrinkable sleeves, and the sleeves are affixed on the items on the manufacturing chain;

f) the parameters of the reverse anamorphosis law are sent to each terminal equipped with the program for decoding coding images, this program being equipped with a module for applying anamorphosis to an image, this module being able to receive said parameters;

g) an image captured by such a terminal on an item provided with a sleeve as obtained in step e) is subjected to a reverse anamorphosis law in the terminal, to reconstitute the original image (with the exception of any errors);

h) the reconstituted image is decoded to derive the unique address accessible by network therefrom.

Alternative 3

This alternative is carried out from numerical data of a template image and numerical data representative of the surface of the three-dimensional volume of the item intended to receive the image, and numerical data representative of one or several virtual sighting axes and an associated virtual focal distance. It comprises the following steps:

a) digital processing means performing virtual processing of the template image on the surface of the 3D volume, to thus place the remarkable points of the template image on said surface of the 3D volume, by storing the spatial coordinates of said remarkable points, b) from these coordinates and a virtual sighting axis and its associated virtual focal distance, digital processing is done of a projection of the points of the remarkable points on a virtual image orthogonal to the virtual sighting axis, c) from this projection, the processing means determine an anamorphosis law, or a series of anamorphosis laws corresponding to the different virtual sighting axes;

d) each unique image to be affixed on an item is subject, in the numerical processing means, to the anamorphosis law(s), and the image(s) having undergone anamorphosis are stored;

e) an image captured on an item using the communicating equipment of a user is sent (optionally after prior processing intended for example to compact the size thereof, to keep only excerpts thereof, etc.) is sent to a server having access to the stored images having undergone anamorphosis;

f) in the server, the image received from the communicating equipment is compared to the stored images having undergone anamorphosis;

g) if a match is found, the code representative of the address of personal content associated with this item, or the address itself, is generated and sent to the communicating equipment so that the latter accesses this address in a personal manner.

It will be noted that the implementation of this alternative with several sighting axes makes it possible to establish anamorphosis laws for several points of view, thereby imposing constraints on the user when he must capture the unique image using his equipment, since several sighting angles are possible.

Of course, one skilled in the art may provide many alternatives and modifications to the invention described above.

In particular:

the implementation of the invention with anamorphic processing applies not only in the case of heat shrinkable sleeves, but also and more generally to all cases with the application of a medium of the unique image on an item or around an item or group of items leads to a deformation of the image (in particular packaging papers, cardboard cartons, adhesive labels, etc. on non-planar surfaces);

the methods according to the invention on the user side can be completed, in particular for security purposes, by any additional means, such as:

reading, in addition to the coding image, an optical code (barcode, QR code, etc.) printed on the same medium as the unique image or on a different medium, visual reading and entry on the communicating equipment of alphanumeric characters printed on the same support as the unique image or on a different medium, sending by SMS message to the communicating equipment or another piece of equipment of the user of a code to be entered on the communicating equipment to validate access to a personal area or to content.

The invention claimed is:

1. A method for producing a plurality of customized consumer items (A), characterized in that it comprises the following steps:

generating a plurality of unique decorative images each respectively encoding a plurality of unique codes (Cx), each unique code (Cx) being reconstructable through analysis of image output from a digital camera of a communicating device that has captured a unique image (ICx), and each unique code (Cx) representing a unique address accessible, via a network, from said communicating device, and printing the unique decorative images on a plurality of respective items (A) or on a plurality of substrates (Sx)

intended to be attached to said plurality of individual or grouped items using a digital printing system, wherein the plurality of unique images (ICx, I(i,j)) are generated by fragmenting a source decorative image (IS) to be visually coherent with one another, wherein the source decorative image (IS) is a vectorial image.

2. The method according to claim 1, wherein the image analysis is done without being color-sensitive.

3. The method according to claim 1, characterized in that the plurality of unique images (ICiji'j', (I(I,j), M(I',j'))) are further generated by superposition on the decorative images (I(i,j)) derived from a fragmentation of the source decorative image (IS) from pattern images (M(i', j')) derived from a fragmentation of at least one source pattern image (MS, MS2).

4. The method according to claim 3, characterized in that the or each source pattern image (MS, MS2) comprises simple geometric elements (Gk) respectively contained in the various zones of a grid (C(i,j)) used for the fragmentation.

5. The method according to claim 1, characterized in that the unique images are also generated from a mirror image (IS'; MS') of the or each source image (IS; MS).

6. The method according to claim 1, wherein the unique addresses comprise unique URL addresses for personal areas.

7. The method according to claim 1, wherein the unique codes (Cx) are associated uniquely with geometric and/or colorimetric characteristics of the unique images.

8. The method according to claim 1, further comprising a step for storing all of the addresses associated with the plurality of items for differentiated processing.

9. The method according to claim 1, applied to unique images printed on media intended to be applied on items such that the unique images are subject to deformation during this application, it comprises a prior step for developing a shared anamorphosis law between the printed unique images and the images as they appear, captured by a camera, on the items.

10. The method according to claim 9, wherein the step for developing an anamorphosis law comprises the sub-steps for printing a template (G) comprising remarkable elements on a template holder (SG), applying the template holder on the item (A) or group of items, taking a shot of the template after application, and determining movement data of the remarkable elements from the acquired image.

11. The method according to claim 9, wherein the step for developing an anamorphosis law comprises the sub-steps consisting of providing data for a virtual template including remarkable points, providing surface data of a three-dimensional volume of the item, developing data of three-dimensional coordinates of the remarkable points after digital processing for application of the virtual template on the surface of the three-dimensional volume of the item, providing data for at least one virtual sighting axis, and determining, from said data of three-dimensional coordinates and sighting axis data, by projection in a virtual image plane, displacement data of the remarkable points between the virtual template and the result of the projection.

12. A method for managing a personal area accessible by network from communicating equipment using a unique address, characterized in that it comprises the following steps:

capturing a unique image on an item obtained using the method according to claim 1 using a camera (C) of the communicating equipment (EC), decoding the unique address (Cx) encoded in the image from the capture, in response to this decoding, accessing the personal area (EPx), in the personal area, performing at least one action from among reading data and writing data.

13. The method according to claim 12, wherein the step for accessing the personal area is made subject to the implementation of another capture of an identical or different coding image using the same communicating equipment.

14. The method according to claim 12, which comprises a step for accessing the personal area in write mode in response to a capture of a unique coding image using a first piece of communicating equipment, and a step for accessing the personal space at least one reading in response to a capture of the same unique coding image using a second piece of communicating equipment.

15. The method according to claim 12, which comprises steps for accessing a shared personal area in response to captures of the same unique coding image by different pieces of communicating equipment.

16. The method according to claim 12, carried out with items obtained using the method according to claim 11, further comprising a step for applying, in the communicating equipment, an inverse law of the shared anamorphosis law to the unique image captured by the camera (C), before the decoding step carried out by the communicating equipment.

17. The method according to claim 12, carried out with items obtained using the method according to claim 11, further comprising, at a server, a step for applying the anamorphosis law to a set of unique images to be applied on items and storing the resulting anamorphosis images, the decoding step being carried out at least partially at the server in the context of a decoding transaction between the communicating equipment having captured an image on an item or medium and said server.

18. The method according to claim 12, wherein the decoding of the image is done by an image analysis process that is not sensitive to colors.

* * * * *